(12) United States Patent
Hull et al.

(10) Patent No.: US 11,428,885 B2
(45) Date of Patent: Aug. 30, 2022

(54) METHODS AND SYSTEMS FOR DEPLOYING OPTICAL FIBER

(71) Applicant: Hifi Engineering Inc., Calgary (CA)

(72) Inventors: John Hull, Calgary (CA); Neil Gulewicz, Calgary (CA); Robert Sokolowski, Calgary (CA); Oleksiy Pletnyov, Calgary (CA); Souheil Merhi, Calgary (CA); Philip Cheuk, Calgary (CA); Seyed Ehsan Jalilian, Calgary (CA)

(73) Assignee: HIFI ENGINEERING INC., Calgary (CA)

( * ) Notice: Subject to any disclaimer, the term of this patent is extended or adjusted under 35 U.S.C. 154(b) by 182 days.

(21) Appl. No.: 17/094,203

(22) Filed: Nov. 10, 2020

(65) Prior Publication Data

US 2021/0055494 A1 Feb. 25, 2021

Related U.S. Application Data

(63) Continuation of application No. 16/485,917, filed as application No. PCT/CA2018/050152 on Feb. 9, 2018, now Pat. No. 10,838,162.

(60) Provisional application No. 62/458,967, filed on Feb. 14, 2017.

(51) Int. Cl.
*G02B 6/44* (2006.01)

(52) U.S. Cl.
CPC ......... *G02B 6/4438* (2013.01); *G02B 6/4464* (2013.01)

(58) Field of Classification Search
CPC ...... G02B 6/4438; G02B 6/4464; G02B 6/52; G02B 6/44
See application file for complete search history.

(56) References Cited

U.S. PATENT DOCUMENTS

| | | | |
|---|---|---|---|
| 4,796,970 A | 1/1989 | Reeve et al. | |
| 5,899,272 A | 5/1999 | Loree | |
| 7,418,177 B2 * | 8/2008 | Lu | G02B 6/4475 385/100 |
| 2005/0109518 A1 | 5/2005 | Blacklaw | |
| 2006/0120672 A1 * | 6/2006 | Cody | G02B 6/4472 385/86 |
| 2007/0071392 A1 * | 3/2007 | Baucom | G02B 6/4475 385/100 |

* cited by examiner

*Primary Examiner* — Jennifer Doan
(74) *Attorney, Agent, or Firm* — D'Ambrosio & Menon, PLLC; Usha Menon

(57) ABSTRACT

There are described methods and systems for deploying optical fiber within a conduit. In one aspect, an optical fiber injector comprising a pressure vessel having a fluid inlet and a fluid outlet. The fluid outlet is engaged with an open end of the conduit. A length of optical fiber is provided within the pressure vessel. The optical fiber is then jetted into the conduit by injecting a fluid into the pressure vessel via the fluid inlet. The optical fiber injector is configured such that the fluid is directed from the fluid inlet to the fluid outlet, and urges the optical fiber to move through the conduit, thereby deploying the optical fiber within the conduit. In a further aspect, there is provided a modular assembly comprising a pipeline and a line of two or more conduits arranged end-to-end. Each pair of opposing ends of adjacent conduits is connected together by a separate splice box. The line is positioned along and adjacent to a length of the pipeline.

26 Claims, 9 Drawing Sheets

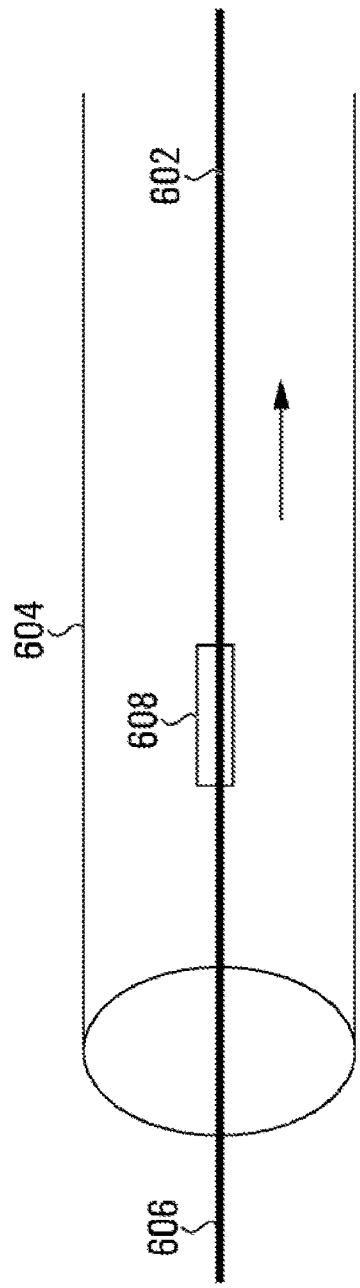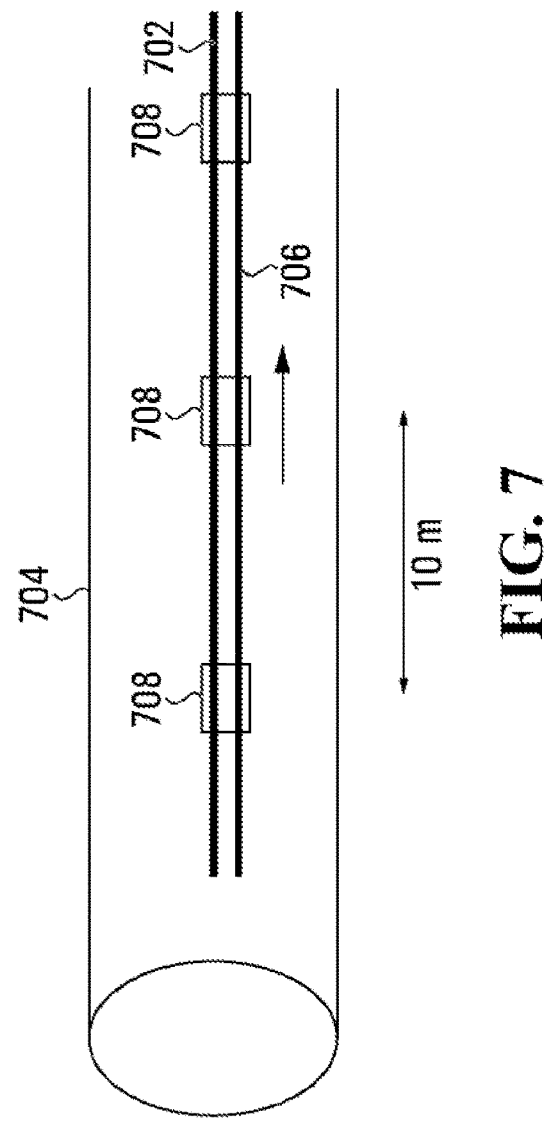

METHODS AND SYSTEMS FOR DEPLOYING OPTICAL FIBER

CROSS REFERENCE TO RELATED APPLICATION

This application is a continuation of and claims priority to U.S. Ser. No. 16/485,917 filed on Aug. 14, 2019, which is a U.S. National Stage entry of PCT/CA2018/050152 filed Feb. 9, 2018, which claims priority to U.S. provisional application Ser. No. 62/458,967 filed Feb. 14, 2017, entitled "Methods and Systems for Deploying Optical Fiber," the contents of which are incorporated herein by reference in its entirety.

FIELD OF THE DISCLOSURE

The present disclosure relates to methods and systems for deploying optical fiber. In particular, the disclosure relates to a modular assembly for deploying optical fiber along a pipeline, and to a method and system including an optical fiber injector for deploying optical fiber within a conduit.

BACKGROUND TO THE DISCLOSURE

Production and transportation of oil and gas generally involves transporting the oil and gas along various types of channels. For example, during conventional oil and gas production, oil and gas are pumped out of a formation via production tubing that has been laid along a wellbore; in this example, the production tubing is the channel. Similarly, when fracking is used to produce oil and gas, the well in which the fracking is performed is the channel. As another example, oil and gas, whether refined or not, can be transported along a pipeline; in this example, the pipeline is the channel. In each of these examples, acoustic events may occur along the channel that are relevant to oil and gas production or transportation. For example, the pipeline or the production tubing may be leaking, and during fracking new fractures may be formed and existing fractures may expand. Each such event is an acoustic event as it makes a noise while it is occurring. It can accordingly be beneficial to detect the presence of these types of acoustic events.

One method of detecting the presence of such acoustic events is through the use of optical fibers. By using optical interferometry, fiber optic cables can be deployed downhole for the detection of acoustic events in channel housing used for the production and transportation of oil and gas. Optical interferometry is a technique in which two separate light pulses are generated: a sensing pulse and a reference pulse. These pulses may be generated by an optical source such as a laser. When optical interferometry is used for fiber optic sensing applications, the sensing and reference pulses are at least partially reflected back towards an optical receiver and interfere with each other resulting in an interference signal. The interference signal can then be analysed to gather information on the acoustic event.

Installation of long-distance optical fiber can be an expensive process. For example, the process of installation of the optical fiber may interfere with the installation of the pipe itself; the fiber optic cables may be damaged while heavy equipment is being used to install the pipe segments; different segments of the pipe may not be easily accessible (such as segments that are installed using horizontal directional boring). In addition, current methods of optical fiber injection typically suffer from range issues. Optical fiber can be injected into a conduit for relatively short distances (a few hundred meters), but for longer distances, or in cases where the installation path is not straight and contains bends and twists, the forces of friction can easily overcome the force of the equipment used to jet the optical fiber.

There is therefore a need in the art for improvements in the way in which optical fiber can be installed or deployed within a conduit. The present disclosure seeks to address such needs.

SUMMARY OF THE DISCLOSURE

In a first aspect of the disclosure, there is provided a method of deploying optical fiber within a conduit, comprising: providing an optical fiber injector comprising a pressure vessel having a fluid inlet and a fluid outlet; engaging the fluid outlet with an open end of a conduit; providing a length of optical fiber within the pressure vessel; and jetting the optical fiber into the conduit by injecting a fluid into the pressure vessel via the fluid inlet, wherein the optical fiber injector is configured such that the fluid is directed from the fluid inlet to the fluid outlet, and urges the optical fiber to move through the conduit, thereby deploying the optical fiber within the conduit.

The pressure vessel may be sealed during jetting of the optical fiber. Sealing of the pressure vessel may comprise ensuring that no fluid may flow into or out of the pressure vessel except via the fluid inlet and fluid outlet.

The fluid may comprise compressed air or a liquid, such as water which may be combined with an amount of antifreeze. The buoyancy of a liquid such as water may further assist in deployment of the optical fiber within the conduit.

The optical fiber may be attached to an optical fiber piston movable through the conduit. The optical fiber injector may be configured such that, during jetting of the optical fiber, the fluid urges the optical fiber piston to move through the conduit, thereby assisting deployment the optical fiber within the conduit. The optical fiber piston may have a width similar to a width of an internal bore of the conduit, such that the optical fiber piston may act substantially as a piston during jetting of the optical fiber. Prior to jetting the optical fiber, the optical fiber piston may be positioned in the open end of the conduit (i.e. the open end of the conduit that is engaged with the fluid outlet).

Prior to providing the length of optical fiber in the pressure vessel, a pull string comprising a flexible elongate member may be deployed in the conduit. Deploying the pull string may comprise: providing a pull string injector comprising a pressure vessel having a fluid inlet and a fluid outlet; engaging the fluid outlet with the open end of the conduit; providing the pull string in the pressure vessel, the pull string being attached to a pull string piston movable through the conduit; and jetting the pull string into the conduit by injecting a fluid into the pressure vessel via the fluid inlet, wherein the pull string injector is configured such that the fluid is directed from the fluid inlet to the fluid outlet and urges the pull string piston to move through the conduit, thereby deploying the pull string within the conduit. The optical fiber injector may be the pull string injector.

Prior to jetting the pull string, the pull string piston may be positioned in the open end of the conduit.

The pull string piston may have a width similar to a width of an internal bore of the conduit, such that the pull string piston may act substantially as a piston during jetting of the pull string.

After jetting the pull string and prior to jetting the optical fiber, the optical fiber piston may be attached to the pull string. During jetting of the optical fiber, the pull string may be retracted from an opposite open end of the conduit so as to impart a tensile force on the optical fiber.

The optical fiber injector may further comprise a spool on which is wound the optical fiber. The method may further comprise rotating the spool during jetting of the optical fiber so as to unwind the optical fiber from the spool.

The optical fiber may be comprised in optical fiber cable. The optical fiber cable may comprise one or more additional fibers for increasing a rigidity of the optical fiber cable.

The optical fiber may be comprised in optical fiber cable. The optical fiber cable may be provided with a coating for increasing a lubricity of the optical fiber cable.

During jetting of the optical fiber, suction may be applied at an open end of the conduit opposite the open end engaged with the fluid outlet, thereby further assisting deployment the optical fiber within the conduit.

In a further aspect of the disclosure, there is provided an optical fiber injector for deploying optical fiber within a conduit, comprising: a pressure vessel having a fluid inlet and a fluid outlet adapted to engage with an open end of a conduit; a spool for having optical fiber wound thereon; and a drive mechanism coupled to the spool and configured when operating to cause the spool to rotate and thereby unwind optical fiber therefrom.

The optical fiber injector may further comprise a length of optical fiber wound on the spool.

The optical fiber injector may be a completely contained pressure vessel that allows the entire spool of optical fiber to be under fluid pressure, such that substantially all of the fluid energy is harnessed for moving the optical fiber within the conduit, eliminating the need for drive tractors and/or compression air fittings.

The optical fiber may be attached to an optical fiber piston movable through the conduit.

The optical fiber injector may further comprise a transparent portion for observing whether optical fiber is moving from the spool towards the fluid outlet.

In a further aspect of the disclosure, there is provided an optical fiber deployment system comprising: a conduit; an optical fiber injector comprising a pressure vessel having a fluid inlet and a fluid outlet, the fluid outlet being engaged with an open end of the conduit; a length of optical fiber in the pressure vessel; and a fluid injector for injecting fluid into the pressure vessel, wherein the fluid injector is fluidly coupled to the fluid inlet and is configured to inject fluid into the pressure vessel such that the fluid is directed from the fluid inlet to the fluid outlet, and urge the optical fiber to move through the conduit, thereby deploying the optical fiber within the conduit.

The pressure vessel may be sealed during injection of the fluid. Sealing of the pressure vessel may comprise ensuring that no fluid may flow into or out of the pressure vessel except via the fluid inlet and fluid outlet.

The fluid injector may comprise a compressor configured to inject compressed air into the pressure vessel. The fluid may comprise a liquid such as water which may be combined with an amount of antifreeze. The buoyancy of a liquid such as water may further assist in deployment of the optical fiber within the conduit.

The optical fiber may be attached to an optical fiber piston movable through the conduit. The optical fiber injector may be configured such that, during injection of the fluid, the fluid urges the optical fiber piston to move through the conduit, thereby assisting deployment of the optical fiber within the conduit.

The system may further comprise a pipeline or a wellbore in acoustic proximity to the conduit. Thus, the optical fiber may be deployed adjacent a wellbore casing, for example, before or during downhole drilling operations.

The optical fiber injector may further comprise a spool on which is wound the optical fiber. The system may further comprise a drive mechanism coupled to the spool and configured when operating to cause the spool to rotate and thereby unwind the optical fiber from the spool.

A pull string comprising a flexible elongate member may be deployed through the conduit. The pull string may be attached to the optical fiber piston.

The system may further comprise a retractor coupled to the pull string and configured when operating to retract the pull string from an opposite open end of the conduit so as to impart a tensile force on the optical fiber.

The system may further comprise a suction device configured, during injection of the fluid, to apply suction at an open end of the conduit opposite the open end engaged with the fluid outlet, thereby further assisting deployment the optical fiber within the conduit.

In a further aspect of the disclosure, there is provided a modular assembly for deployment of optical fiber along a pipeline, the modular assembly comprising: a pipeline; and a line of two or more conduits arranged end-to-end, each pair of opposing ends of adjacent conduits being connected together by a separate splice box, wherein the line is positioned along and adjacent to a length of the pipeline.

The modular assembly may further comprise an optical fiber disposed within each of the conduits.

The modular assembly may allow an operator to replace a section of fiber that has become damaged, without having to replace the entire length of fiber. By using conduits, the risks during fiber installation are reduced, i.e. the installation crew do not need to worry about the delicate fiber during the pipeline installation. The conduit may be simply placed inside a trench, and fiber can be installed at a later date.

The optical fibers disposed within each pair of adjacent conduits may be optically connected together via the splice box connecting together the pair of adjacent conduits so as to form a light path through the line. The optical fiber disposed within each of the conduits may comprise at least one pair of fiber Bragg gratings. The modular assembly may further comprise an optical interrogator optically coupled to the optical fiber disposed within the conduit at an input end of the line. The optical interrogator may be operable to transmit light into the optical fiber disposed within the conduit at the input end, and the optical interrogator may be operable to receive from the optical fiber disposed within the conduit at the input end the transmitted light which has been reflected by the at least one pair of fiber Bragg gratings.

The modular assembly may further comprise an absorption unit optically coupled to the optical fiber disposed within the conduit at an absorption end of the line. The absorption unit may be operable to absorb light output from the optical fiber disposed within the conduit at the absorption end so as to prevent the output light reflecting back into the optical fiber disposed within the conduit at the absorption end.

The modular assembly may further comprise an additional optical fiber disposed within each of a plurality of the conduits. The plurality may form an unbroken portion of the line and may include the conduit at the input end. The additional optical fibers may be optically connected together via the splice boxes connecting together the plurality of the conduits so as to form an additional light path through at least a portion of the line. The additional optical fiber disposed within the conduit at the input end may be optically coupled to the optical interrogator.

Multiple service fibers also allow the modular assembly to be more robust; for example if the sensing fiber in one zone is cut off, the remainder of the sensing optical fiber, in other conduits, may still operate. In addition, service fibers help provide separate travel paths for the light travelling to different segments of the conduits. Thus, light that travels to a conduit segment that is more distant from the interrogator does not have to travel through the previous conduit segments' sensing fiber (as it travels instead through that particular conduit segment's service fiber) and is thus not attenuated by the FBGs of the previous conduit's sensing fiber. In addition, service fibers may reduce the optical collisions between the light packets traveling in the different conduits. The service fibers may act as dedicated lead-in and lead-out fibers to each conduit, and may ensure that the interrogator can launch light into, and receive light back from, each conduit without that light having to travel through any previous conduit's sensing fiber.

The plurality of the conduits may include all of the conduits of the line. The additional optical fiber disposed within the conduit at the absorption end may be optically coupled to the absorption unit.

At least one of the splice boxes connecting together a pair of adjacent conduits may comprise a circulator. The one conduit of the pair of adjacent conduits closest an input end of the line may comprise a lead-in optical fiber and a separate return optical fiber. The lead-in and return optical fiber may be optically coupled to the circulator. The one conduit of the pair of adjacent conduits closest an absorption end of the line may comprise a sensing optical fiber optically coupled to the circulator and comprising a pair of fiber Bragg gratings. The circulator may be operable to direct light from the lead-in optical fiber to the sensing optical fiber, and to direct light reflected by the pair of fiber Bragg gratings from the sensing optical fiber to the return optical fiber.

The modular assembly may further comprise an optical interrogator having a transmission coupler and a receiver coupler, the transmission coupler being optically coupled to the lead-in optical fiber such that the optical interrogator is operable to transmit light into the lead-in optical fiber, and the receiver coupler being optically coupled to the return optical fiber such that the optical interrogator is operable to detect from the return optical fiber the transmitted light reflected by the pair of fiber Bragg gratings.

An additional one of the splice boxes connecting together an additional pair of adjacent conduits may comprise an additional circulator. The one conduit of the additional pair of adjacent conduits closest an input end of the line may comprise an additional lead-in optical fiber and a separate additional return optical fiber. The additional lead-in and additional return optical fibers may be optically coupled to the additional circulator. The one conduit of the additional pair of adjacent conduits closest an absorption end of the line may comprise an additional sensing optical fiber optically coupled to the additional circulator and comprising an additional pair of fiber Bragg gratings. The additional circulator may be operable to direct light from the additional lead-in optical fiber to the additional sensing optical fiber, and may be operable to direct light reflected by the additional pair of fiber Bragg gratings from the additional sensing optical fiber to the additional return optical fiber.

At least one of the conduits of the line may be divided into multiple separate channels. Each channel may be dimensioned to carry a separate optical fiber.

One of the conduits of the line may comprise a rod or tape releasably fixed to an internal surface of the one conduit.

Each conduit may be made from a stainless steel capillary tube. Each conduit may be made from high-density polyethylene, and may comprise dual or multi-duct versions of the conduits found at http://www.duraline.com/content/futurepath.

The line may be positioned within one meter of the length of the pipeline.

The line may be fixed to an outer surface of the length of the pipeline.

In a further aspect of the disclosure, there is provided a method for deploying optical fiber along a pipeline, the method comprising: installing a modular assembly along and adjacent to a length of the pipeline, the modular assembly comprising a line of two or more conduits arranged end-to-end, each pair of opposing ends of adjacent conduits being connected together by a separate splice box; disposing optical fiber within each conduit of the installed modular assembly; and optically connecting together the optical fibers disposed within each pair of adjacent conduits via the splice box connecting together the pair of adjacent conduits.

Installing the modular assembly may comprise coupling the modular assembly to the length of the pipeline prior to installation of the pipeline such that the modular assembly is installed with the pipeline.

Installing the modular assembly may comprise positioning the modular assembly within one meter of the length of the pipeline after the pipeline has been installed.

Installing the modular assembly may comprise fixing at least one conduit of the modular assembly to an outer surface of the length of the pipeline.

Disposing optical fiber into each conduit may comprise pushing at least one optical fiber through at least one conduit using a cable-jetting device or a spooling device.

Disposing optical fiber into each conduit may comprise pulling at least one optical fiber through at least one conduit using a rod or tape. The rod or tape may be connected to the at least one optical fiber and extends through a majority of the at least one conduit.

The rod or tape may be releasably fixed to an internal surface of the at least one conduit prior to being used to pull the at least one optical fiber through the at least one conduit.

The disposing of optical fiber into at least one of the conduits may be carried out using any of the above-described methods.

The method may further comprise disconnecting an optical fiber disposed within one of the conduits from the splice boxes connected at either end of the one conduit; removing the disconnected optical fiber from the one conduit; disposing a replacement optical fiber within the one conduit and optically connecting the replacement optical fiber to the splice boxes connected at either end of the one conduit.

The method may further comprise determining that the optical fiber is malfunctioning prior to disconnecting the optical fiber.

BRIEF DESCRIPTION OF THE DRAWINGS

Embodiments of the disclosure will now be described in conjunction with the accompanying drawings of which:

FIG. 6 is a schematic of a method of deploying optical fiber within a conduit, in accordance with an embodiment of the disclosure;

FIG. 7 is a schematic of a method of deploying optical fiber within a conduit, in accordance with an embodiment of the disclosure;

DETAILED DESCRIPTION OF SPECIFIC EMBODIMENTS

The present disclosure seeks to provide improved methods and systems for deploying optical fiber. While various embodiments of the disclosure are described below, the disclosure is not limited to these embodiments, and variations of these embodiments may well fall within the scope of the disclosure which is to be limited only by the appended claims.

Figure 1:
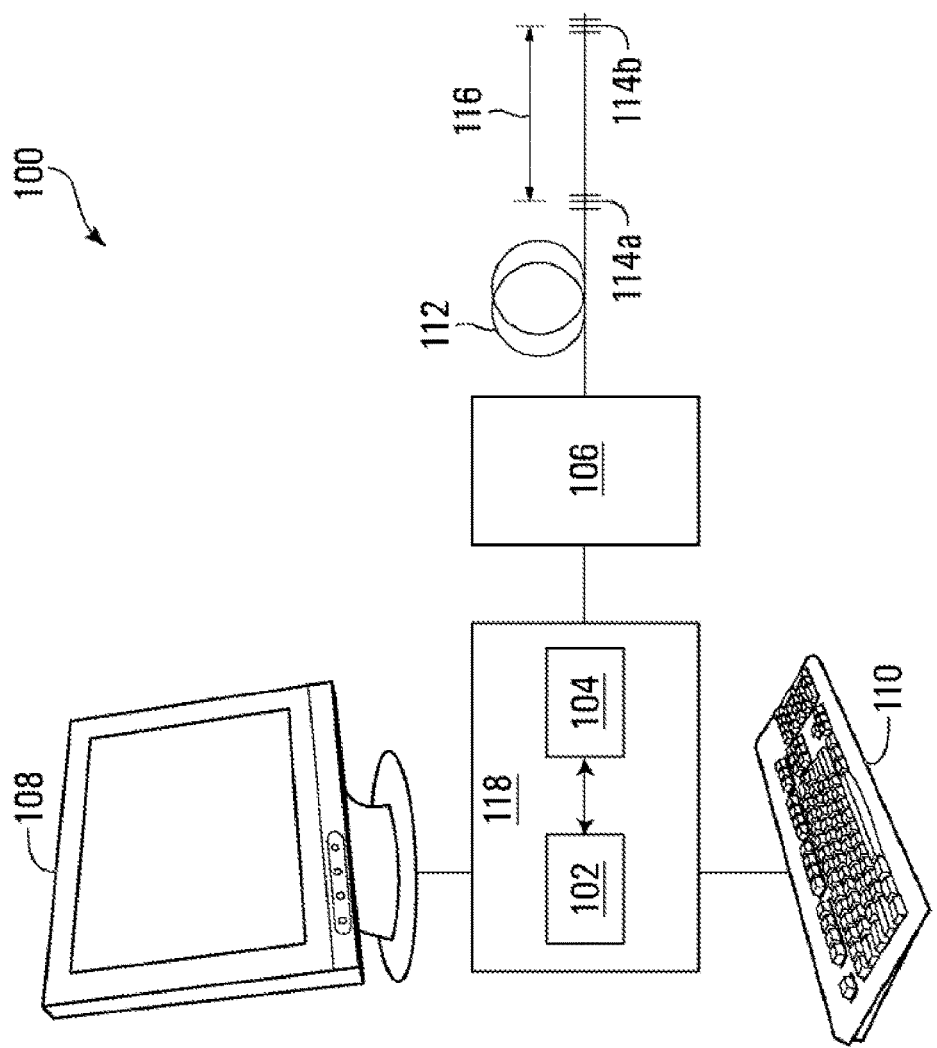
FIG. 1 is a block diagram of a system for processing acoustic data from a pipeline, which includes an optical fiber with fiber Bragg gratings ("FBGs") for reflecting a light pulse.

Referring now to FIG. 1, there is shown one embodiment of a system 100 for fiber optic sensing using optical fiber interferometry. The system 100 comprises an optical fiber 112, an interrogator 106 optically coupled to the optical fiber 112, and a signal processing device (controller) 118 that is communicative with the interrogator 106. While not shown in FIG. 1, within the interrogator 106 are an optical source, optical receiver, and an optical circulator. The optical circulator directs light pulses from the optical source to the optical fiber 112 and directs light pulses received by the interrogator 106 from the optical fiber 112 to the optical receiver.

The optical fiber 112 comprises one or more fiber optic strands, each of which is made from quartz glass (amorphous $SiO_2$). The fiber optic strands are doped with a rare earth compound (such as germanium, praseodymium, or erbium oxides) to alter their refractive indices, although in different embodiments the fiber optic strands may not be doped. Single mode and multimode optical strands of fiber are commercially available from, for example, Corning® Optical Fiber. Example optical fibers include ClearCurve™ fibers (bend insensitive), SMF28 series single mode fibers such as SMF-28 ULL fibers or SMF-28e fibers, and InfiniCor® series multimode fibers.

The interrogator 106 generates sensing and reference pulses and outputs the reference pulse after the sensing pulse. The pulses are transmitted along optical fiber 112 that comprises a first pair of fiber Bragg gratings (FBGs). The first pair of FBGs comprises first and second FBGs 114a,b (generally, "FBGs 114"). The first and second FBGs 114a,b are separated by a certain segment 116 of the optical fiber 112 ("fiber segment 116"). The length of the fiber segment 116 varies in response to an acoustic vibration that the optical fiber 112 experiences. Each fiber segment 116 between any pair of adjacent FBGs 114 with substantially identical center wavelengths is referred to as a "channel" of the system 200.

The light pulses have a wavelength identical or very close to the center wavelength of the FBGs 114, which is the wavelength of light the FBGs 114 are designed to partially reflect; for example, typical FBGs 114 are tuned to reflect light in the 1,000 to 2,000 nm wavelength range. The sensing and reference pulses are accordingly each partially reflected by the FBGs 114a,b and return to the interrogator 106. The delay between transmission of the sensing and reference pulses is such that the reference pulse that reflects off the first FBG 114a (hereinafter the "reflected reference pulse") arrives at the optical receiver 103 simultaneously with the sensing pulse that reflects off the second FBG 114b (hereinafter the "reflected sensing pulse"), which permits optical interference to occur.

While FIG. 1 shows only the one pair of FBGs 114a,b, in different embodiments (not depicted) any number of FBGs 114 may be on the fiber 112, and time division multiplexing ("TDM") (and optionally, wavelength division multiplexing ("WDM")) may be used to simultaneously obtain measurements from them. If two or more pairs of FBGs 114 are used, any one of the pairs may be tuned to reflect a different center wavelength than any other of the pairs. Alternatively a group of multiple FBGs 114 may be tuned to reflect a different center wavelength to another group of multiple FBGs 114 and there may be any number of groups of multiple FBGs 114 extending along the optical fiber 112 with each group of FBGs 114 tuned to reflect a different center wavelength. In these example embodiments where different pairs or group of FBGs 114 are tuned to reflect different center wavelengths to other pairs or groups of FBGs 114, WDM may be used in order to transmit and to receive light from the different pairs or groups of FBGs 114, effectively extending the number of FBG pairs or groups that can be used in series along the optical fiber 112 by reducing the effect of optical loss that otherwise would have resulted from light reflecting from the FBGs 114 located on the fiber 112 nearer to the optical source 101. When different pairs of the FBGs 114 are not tuned to different center wavelengths, TDM is sufficient.

The interrogator 106 emits laser light with a wavelength selected to be identical or sufficiently near the center wavelength of the FBGs 114 that each of the FBGs 114 partially reflects the light back towards the interrogator 106. The timing of the successively transmitted light pulses is such that the light pulses reflected by the first and second FBGs 114a,b interfere with each other at the interrogator 106, and the optical receiver 103 records the resulting interference signal. The acoustic vibration that the fiber segment 116 experiences alters the optical path length between the two FBGs 114 and thus causes a phase difference to arise between the two interfering pulses. The resultant optical power at the optical receiver 103 can be used to determine this phase difference. Consequently, the interference signal that the interrogator 106 receives varies with the acoustic vibration the fiber segment 116 is experiencing, which allows the interrogator 106 to estimate the magnitude of the acoustic vibration the fiber segment 116 experiences from the received optical power. The interrogator 106 digitizes the phase difference and outputs an electrical signal ("output signal") whose magnitude and frequency vary directly with the magnitude and frequency of the acoustic vibration the fiber segment 116 experiences.

The signal processing device (controller) 118 is communicatively coupled to the interrogator 106 to receive the output signal. The signal processing device 118 includes a processor 102 and a non-transitory computer readable medium 104 that are communicatively coupled to each other. An input device 110 and a display 108 interact with the processor 102. The computer readable medium 104 has encoded on it statements and instructions to cause the processor 102 to perform any suitable signal processing methods to the output signal. Example methods include those described in PCT application PCT/CA2012/000018 (publication number WO 2013/102252), the entirety of which is hereby incorporated by reference.

Figure 2:
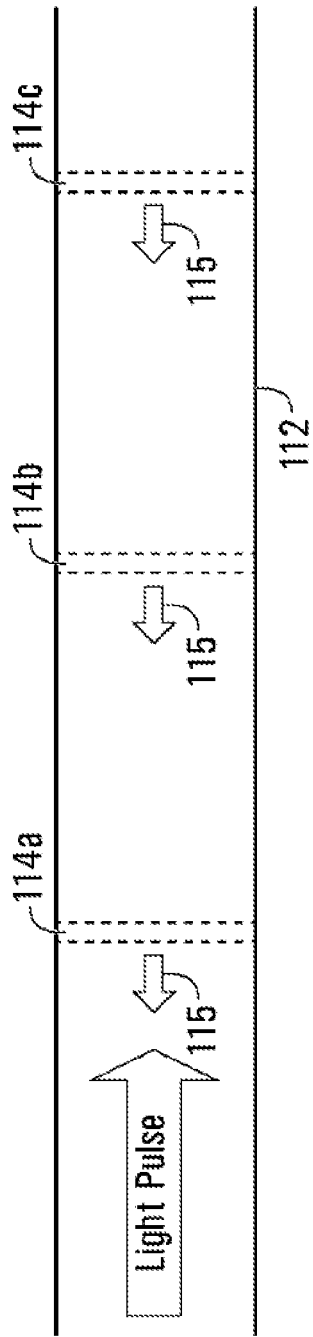
FIG. 2 is a schematic that depicts how the FBGs reflect a light pulse.

FIG. 2 depicts how the FBGs 114 reflect the light pulse, according to another embodiment in which the optical fiber 112 comprises a third FBG 114c. In FIG. 2, the second FBG 114b is equidistant from each of the first and third FBGs 114a,c when the fiber 112 is not strained. The light pulse is propagating along the fiber 112 and encounters three different FBGs 114, with each of the FBGs 114 reflecting a portion 115 of the pulse back towards the interrogator 106. In embodiments comprising three or more FBGs 114, the portions of the sensing and reference pulses not reflected by the first and second FBGs 114a,b can reflect off the third FBG 114c and any subsequent FBGs 114, resulting in interferometry that can be used to detect an acoustic vibration along the fiber 112 occurring further from the optical source 101 than the second FBG 114b. For example, in the embodiment of FIG. 2, a portion of the sensing pulse not reflected by the first and second FBGs 114a,b can reflect off the third FBG 114c and a portion of the reference pulse not reflected by the first FBG 114a can reflect off the second FBG 114b, and these reflected pulses can interfere with each other at the interrogator 106.

Any changes to the optical path length of the fiber segment 116 result in a corresponding phase difference between the reflected reference and sensing pulses at the interrogator 106. Since the two reflected pulses are received as one combined interference pulse, the phase difference between them is embedded in the combined signal. This phase information can be extracted using proper signal processing techniques, such as phase demodulation. The relationship between the optical path of the fiber segment 116 and that phase difference ($\theta$) is as follows: $\theta = 2\pi nL/\lambda$, where n is the index of refraction of the optical fiber; L is the optical path length of the fiber segment 116; and $\lambda$ is the wavelength of the optical pulses. A change in nL is caused by the fiber experiencing longitudinal strain induced by energy being transferred into the fiber. The source of this energy may be, for example, an object outside of the fiber experiencing dynamic strain, undergoing vibration, emitting energy or a thermal event.

Figure 3:
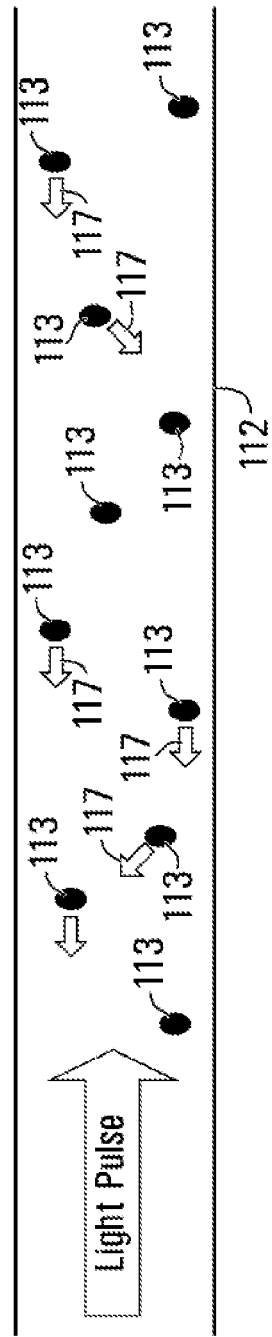
FIG. 3 is a schematic that depicts how a light pulse interacts with impurities in an optical fiber that results in scattered laser light due to Rayleigh scattering, which is used for distributed acoustic sensing ("DAS")

One conventional way of determining $\Delta nL$ is by using what is broadly referred to as distributed acoustic sensing ("DAS"). DAS involves laying the fiber 112 through or near a region of interest (e.g. a pipeline) and then sending a coherent laser pulse along the fiber 112. As shown in FIG. 3, the laser pulse interacts with impurities 113 in the fiber 112, which results in scattered laser light 117 because of Rayleigh scattering. Vibration or acoustics emanating from the region of interest results in a certain length of the fiber becoming strained, and the optical path change along that length varies directly with the magnitude of that strain. Some of the scattered laser light 117 is back scattered along the fiber 112 and is directed towards the optical receiver 103, and depending on the amount of time required for the scattered light 117 to reach the receiver and the phase of the scattered light 117 as determined at the receiver, the location and magnitude of the vibration or acoustics can be estimated with respect to time. DAS relies on interferometry using the reflected light to estimate the strain the fiber experiences. The amount of light that is reflected is relatively low because it is a subset of the scattered light 117. Consequently, and as evidenced by comparing FIGS. 1B and 1C, Rayleigh scattering transmits less light back towards the optical receiver 103 than using the FBGs 114.

DAS accordingly uses Rayleigh scattering to estimate the magnitude, with respect to time, of the acoustic vibration experienced by the fiber during an interrogation time window, which is a proxy for the magnitude of the acoustic vibration. In contrast, the embodiments described herein measure acoustic vibrations experienced by the fiber 112 using interferometry resulting from laser light reflected by FBGs 114 that are added to the fiber 112 and that are designed to reflect significantly more of the light than is reflected as a result of Rayleigh scattering. This contrasts with an alternative use of FBGs 114 in which the center wavelengths of the FBGs 114 are monitored to detect any changes that may result to it in response to strain. In the depicted embodiments, groups of the FBGs 114 are located along the fiber 112. A typical FBG can have a reflectivity rating of 2% or 5%. The use of FBG-based interferometry to measure interference causing events offers several advantages over DAS, in terms of optical performance.

Figure 4:
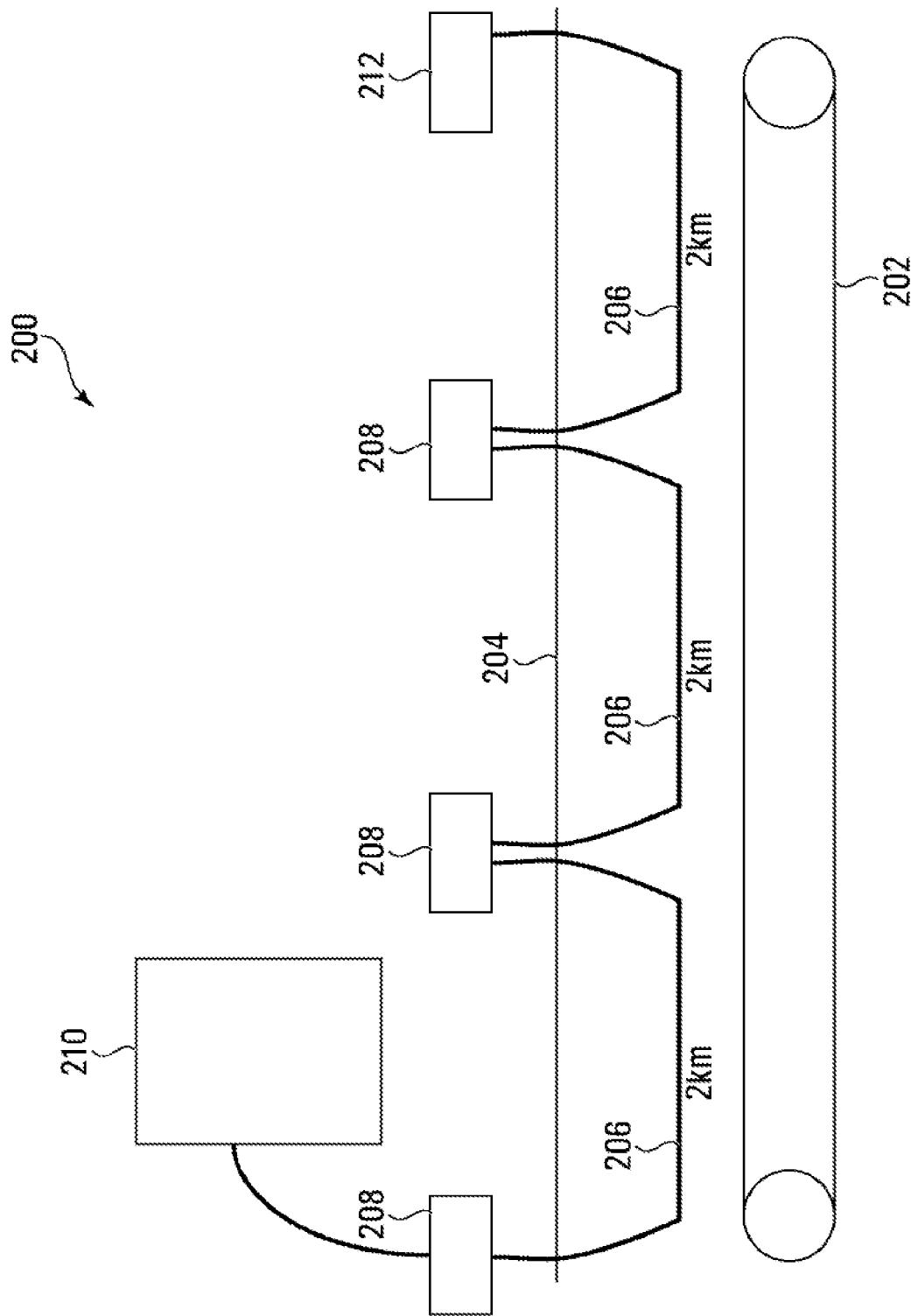
FIG. 4 is a schematic of a modular assembly for deploying optical fiber along a pipeline, in accordance with an embodiment of the disclosure.

Now turning to FIG. 4, there is shown a modular assembly 200 for deployment of optical fiber along a pipeline, in accordance with an embodiment of the disclosure. Modular assembly 200 comprises a subterranean pipeline 202 extending beneath ground 204. A line of conduits 206 extends parallel to pipeline 202, with pairs of adjacent conduits 206 arranged end-to-end. Conduits 206 are positioned within acoustic proximity (for example 1 meter or less) of pipeline 202, such that acoustic events originating from pipeline 202 will reach one or more of conduits 206 without substantially complete energy loss. While a separation of 1 meter or less between conduits 206 and pipeline 202 generally provides for ideal data acquisition, it is possible for conduits 206 to be positioned further away from pipeline 202. In some embodiments, conduits 206 may be manually placed in a trench directly on, or buried near, pipeline 202. For example, in some embodiments conduits 206 may be placed on an outside surface of pipeline 202. It may also be possible to use a side boom to lower pipeline 202 and conduit 206 into the trench simultaneously. In the present embodiment, each conduit 206 is about 2 km in length, although greater or smaller lengths are possible. In some embodiments, different conduits 206 may have different lengths.

Although not shown in FIG. 4, each conduit 206 comprises an optical fiber disposed therein. Each pair of opposing ends of adjacent conduits 206 is connected together by a separate splice box 208. The optical fibers disposed within each pair of adjacent conduits 206 are optically connected together via the splice box 208 connecting together the pair of adjacent conduits 2016 so as to form a light path through the line of conduits 206. Although not shown in FIG. 4, the optical fibers disposed within each of the conduits 206 comprise at least one pair of fiber Bragg gratings, for example as described above in connection with FIGS. 1-3. Modular assembly 200 further comprises a data acquisition box 210 similar to signal processing device 118 described above. The optical fiber disposed within conduit 206 furthest from data acquisition box 210 terminates in a termination point 212 configured such that light reaching termination point 212 is absorbed and not reflected back down the optical fiber.

Figure 5:
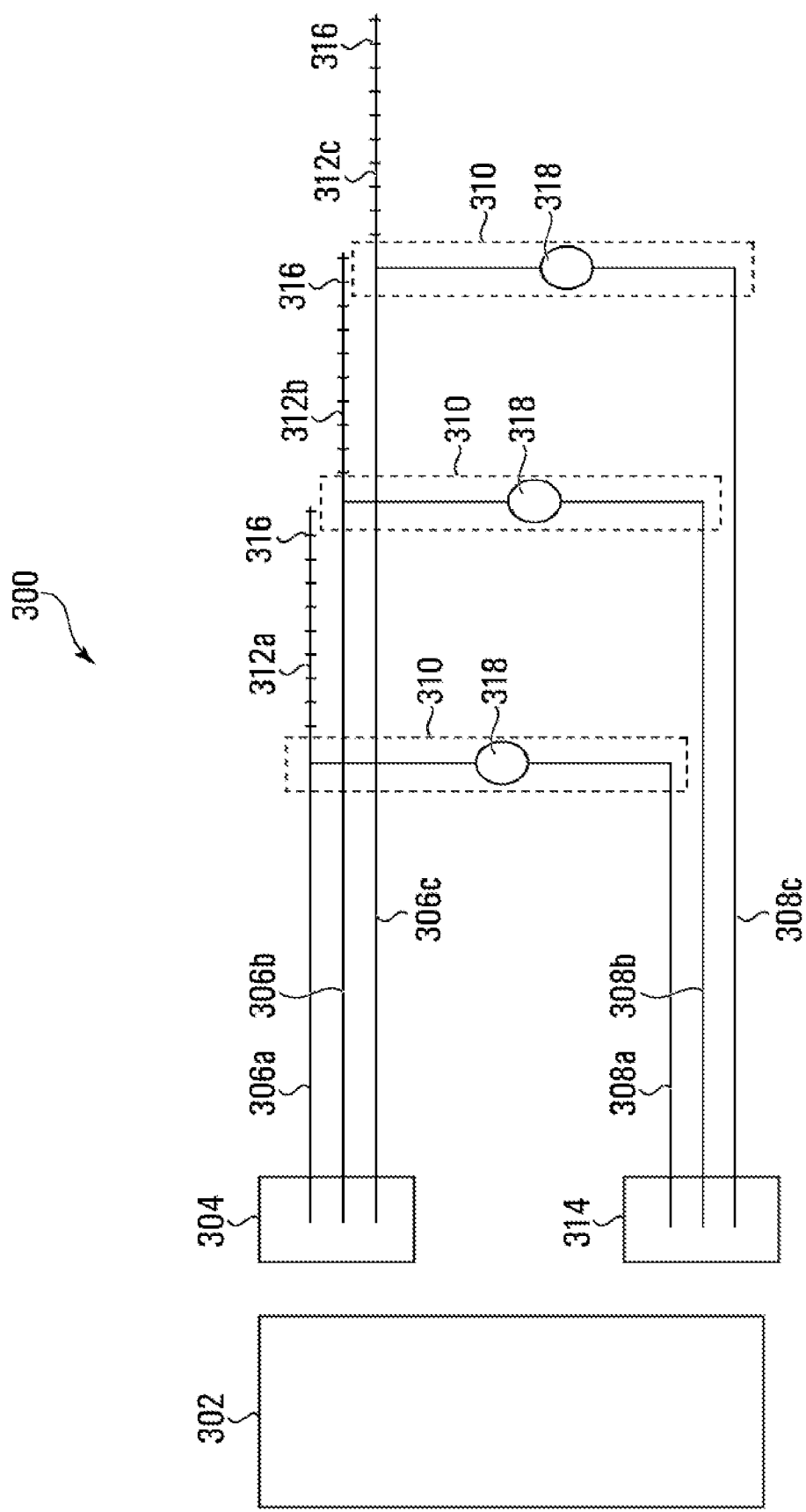
FIG. 5 is a schematic of a modular assembly comprising multiple optical fibers, in accordance with an embodiment of the disclosure.

Turning to FIG. 5, there is shown another embodiment of a modular assembly 300 for deployment of optical fiber along a pipeline. In this embodiment, in addition to sensing optical fibers comprising FBGs as described above, modular assembly 300 includes a number of service optical fibers (i.e. non-sensing optical fibers) for maximizing data quality. As seen in FIG. 5, non-sensing optical fibers include lead-in optical fibers 306a-c and return optical fibers 308a-c. Lead-in optical fibers 306a-c are optically coupled to corresponding return optical fibers 308a-c via splice boxes 310. At each splice box 310, one of lead-in optical fibers 306a-c is further optically connected to a corresponding sensing optical fiber 310a-c deployed within conduit (not shown, though as described above in connection with FIG. 4). Sensing optical fibers 310a-c include fiber Bragg gratings 316 as described above. Each splice box 310 comprises a circulator 318 operable to direct light from one of lead-in optical fibers 306a-c to a respective one of sensing optical fibers 310a-c, and to direct light reflected by fiber Bragg gratings 316 from sensing optical fibers 310a-c to return optical fibers 308a-c.

An optical interrogator 302 is optically coupled, via a transmission coupler 304, to lead-in optical fibers 306a-c. Transmission coupler 304 is optically coupled to lead-in optical fibers 306a-c such that optical interrogator 302 is operable to transmit light into lead-in optical fibers 306a-c. Optical interrogator 302 is further optically coupled, via a receiver coupler 314, to return optical fibers 308a-c. Receiver coupler 314 is optically coupled to return optical fibers 308a-c such that optical interrogator 302 is operable to detect from return optical fibers 308a-c the transmitted light which has been reflected by fiber Bragg gratings 316.

While the embodiment of FIG. 5 shows three lead-in optical fibers, three return optical fibers, and three sensing optical fibers, the number of optical fibers may be increased or decreased, and in so doing the number of splice boxes and circulators may also be accordingly increased or decreased. In order to assist with positioning of the optical fibers, one or more of conduits 206 may be divided into multiple separate channels, and each channel may be dimensioned to carry a separate optical fiber (for example each channel may carry a lead-in optical fiber, a return optical fiber or a sensing optical fiber).

Advantageously, with either of the modular assemblies described above, relatively easy replacement of a defective optical fiber may be carried out, without having to remove the entire line of optical fiber. Should a length of optical fiber be found defective, then the optical fiber is disconnected from its splice boxes. The optical fiber is then removed from the conduit, and a replacement optical fiber is deployed within the conduit and optically connected to the splice boxes connected at either end of the conduit.

Various methods may be used in order to insert or otherwise deploy the optical fiber within a conduit. In one example, as shown in FIG. 6, a fiberglass rod 602 may be inserted into conduit 604 using a cable-jetting device (for example using the optical fiber injector described below). Rod 602 may then be used to pull optical fiber 606. In this method, fiberglass rod 602 and optical fiber 606 are attached together in a tip-to-tale fashion, via use of a pre-installed pull tape 608. In an alternative embodiment, shown in FIG. 7, fiberglass rod 702 is pre-taped to optical fiber 706, approximately every 10 m (though other distances may be used). This ensures that optical fiber 706 does not experience too much strain while being pulled. Fiberglass rod 702 and optical fiber 706 are then jetted simultaneously into conduit 704 using a cable-jetting device, for example the optical fiber injector described below.

There will now be described a particular method of deploying optical fiber within a conduit. Such a method may be used to deploy optical fiber within one or more conduits forming part of either of the modular assemblies described above in connection with FIGS. 4 and 5. In general, this method of deploying optical fiber uses an optical fiber injector to inject the optical fiber, using pressurized air, into the conduit.

Figure 8:
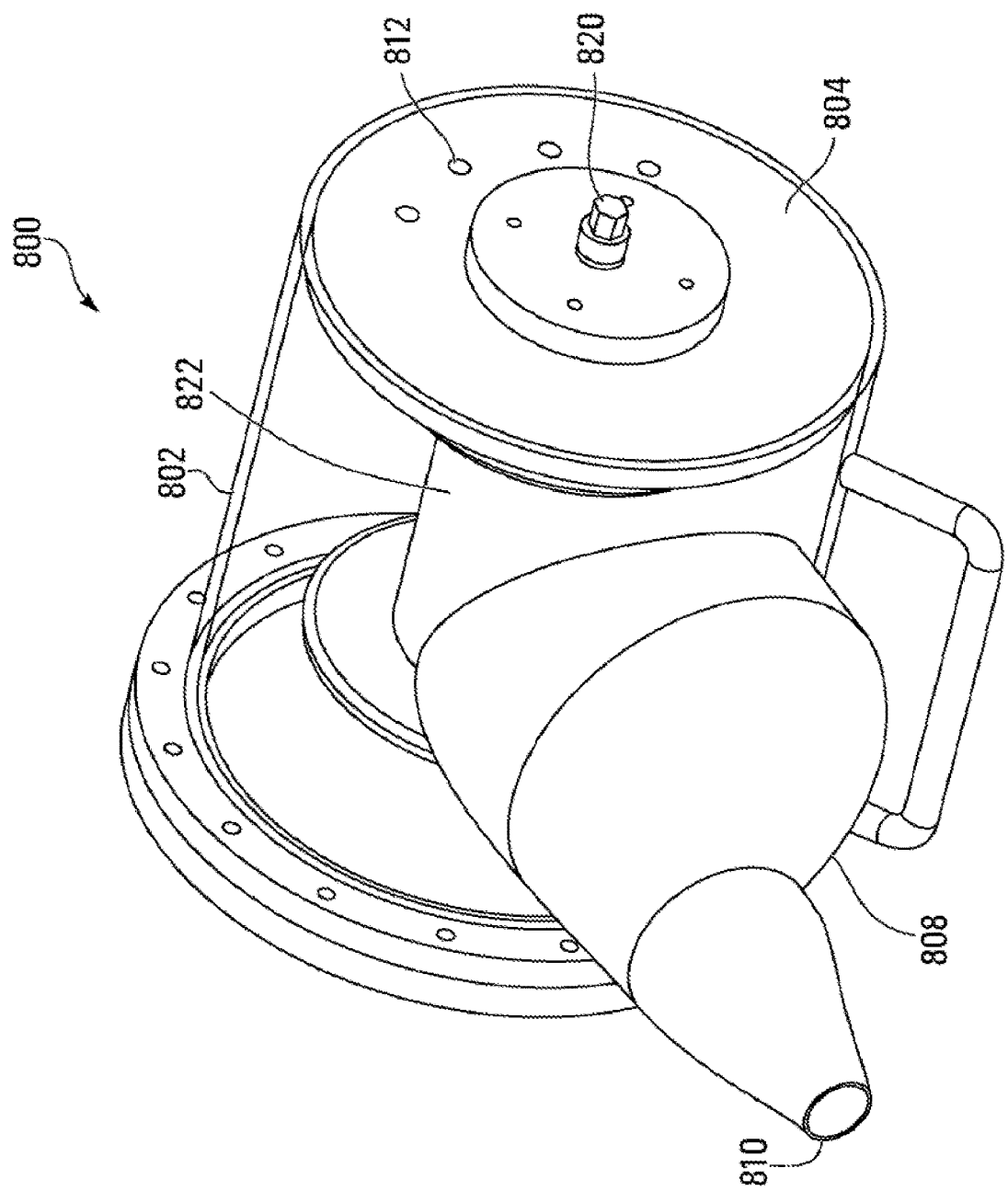
FIG. 8 is a perspective view of an optical fiber injector, in accordance with an embodiment of the disclosure.

Turning to FIG. 8, there is shown an embodiment of an optical fiber injector 800 in accordance with an embodiment of the disclosure. Injector 800 is formed from a cylindrical pressure vessel 802 sealable by a removable cover 804. Extending away from pressure vessel 802 in a largely tangential direction is a tapered snout 808 terminating in an air outlet 810. A number of ports 812 are provided in cover 804 to allow for the injection of pressurized air into pressure vessel 802. A rotatable spool 822 is provided within pressure vessel 802, and is mounted on a shaft 820 extending through pressure vessel 802. Rotation of shaft 820 results in corresponding rotation of spool 822.

Figure 9:
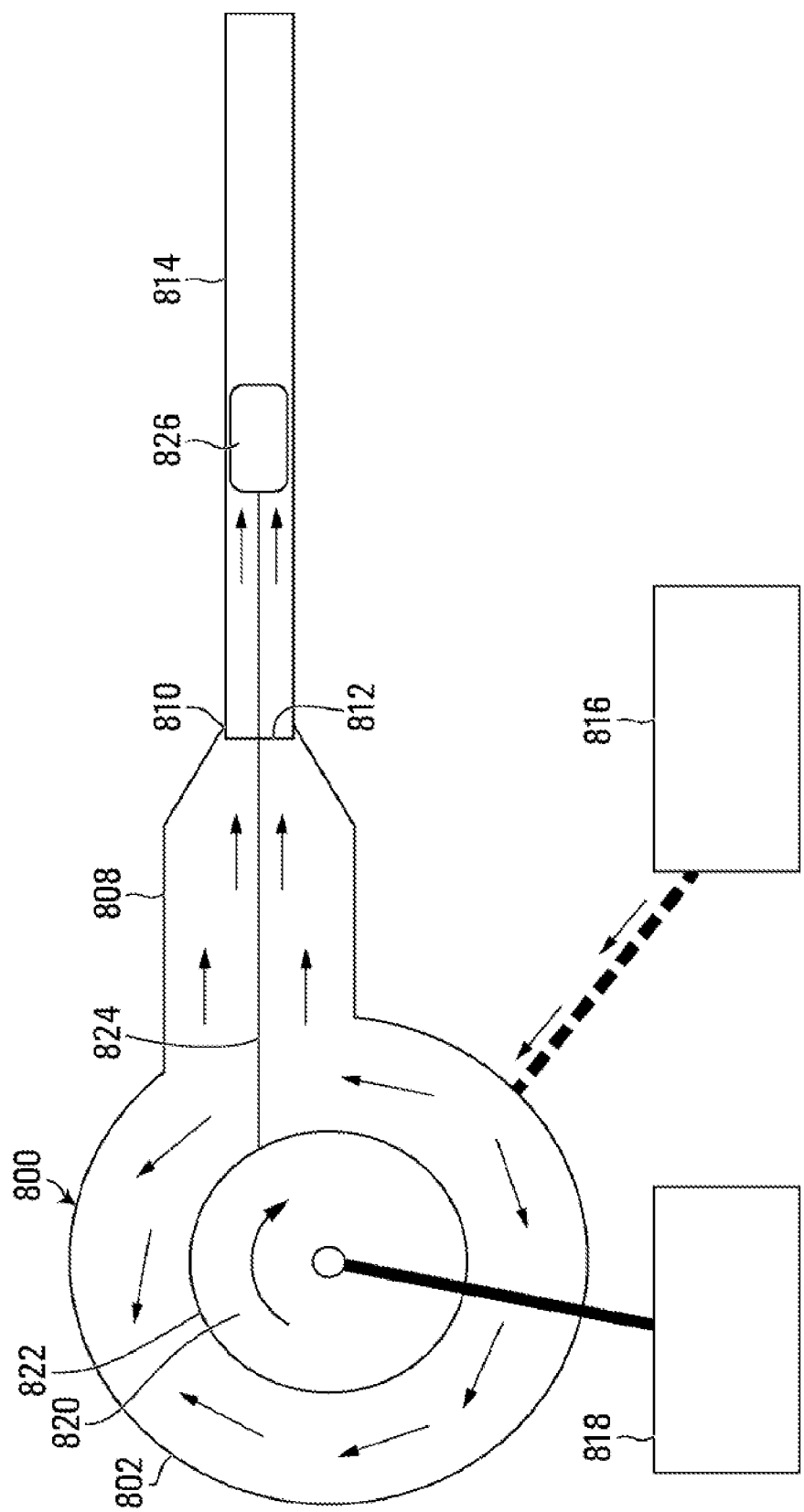
FIG. 9 is a schematic of the optical fiber injector in operation.

Turning to FIG. 9, there is shown a diagram of how injector 800 functions in practice. Injector 800 is positioned such that air outlet 810 sealingly engages with an open end 812 of conduit 814. A compressor 816 is coupled to ports 812 on injector 800 such that air compressor may inject or otherwise supply compressed air into pressure vessel 802. A drive mechanism such as a motor 818 is coupled to a shaft 820 running though pressure vessel 802. On shaft 820 is provided spool 822 with optical fiber cable 824 wound thereon. Operation of motor 818 causes shaft 820 to rotate, resulting in corresponding rotation of spool 822 and unwinding of optical fiber cable 824 from spool 822. An optical fiber piston 826 is attached to the end of optical fiber cable 824. Piston 826 is sized and dimensioned to be movable through conduit 814. Should conduit 814 include any bends, then piston 826 is preferably sized and dimensioned to be able to move past any such bends without becoming stuck in conduit 814. As seen by the direction of arrows in FIG. 9, injected pressurized air is directed around cylindrical pressure vessel 802 and towards air outlet 810, where acts on piston 826 and thereby urges piston 826 into and along conduit 814. Consequently, optical fiber cable 824 is urged into and along conduit 814. In some embodiments, it may be possible to jet optical fiber cable 824 within the conduit without the assistance of piston 826. This may be the case if, for example, optical fiber cable 824 comprises sufficient rigidity.

In order to assist with deployment of optical fiber cable 824 within conduit 814, optical fiber cable 824 preferably comprises reinforced fiber in addition to optical fiber. For example, optical fiber cable 824 may comprise a 1000d aramid fiber built in beside the optical fiber, in order to offer additional pull strength. Furthermore, an outer coating of Hytrel® may be applied to the optical fiber, and a fluorinated ethylene propylene top coat may also be applied, which may increase the lubricity of optical fiber cable 824. Thus, optical fiber cable 824 may comprise improved stiffness and structure while remaining relatively thin at about 0.002" in diameter.

Figure 10:
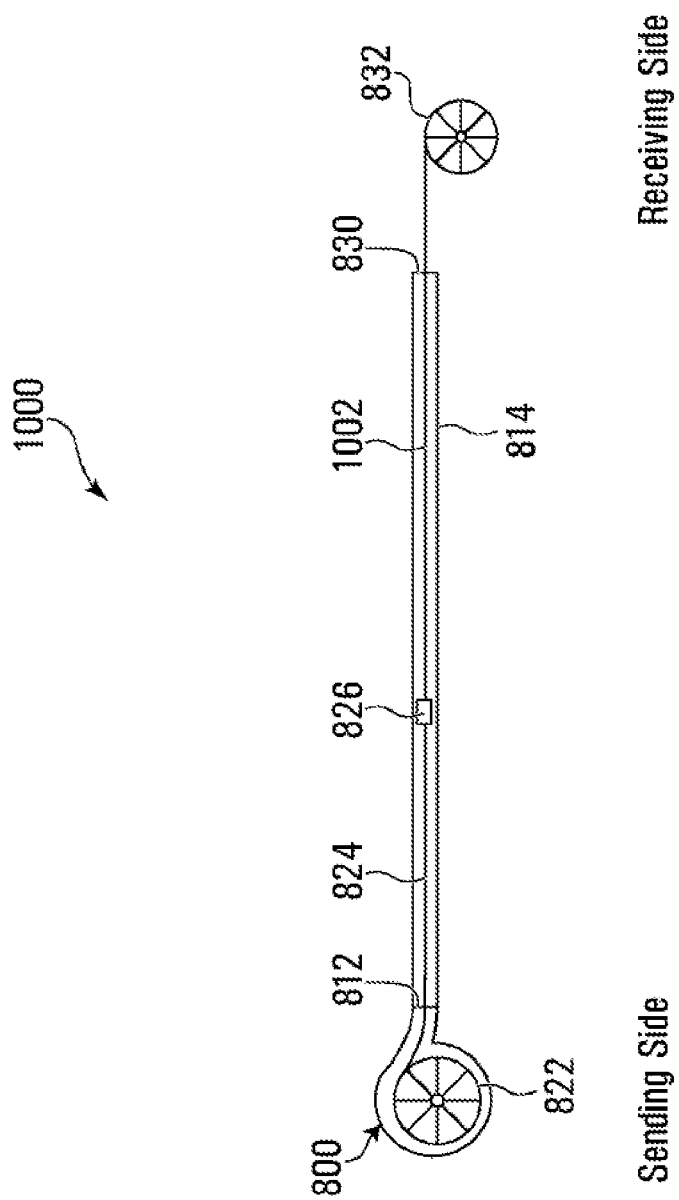
FIG. 10 is a schematic of an optical fiber injector and an optical fiber retractor deploying optical fiber within a conduit, in accordance with an embodiment of the disclosure.
Figure 11:
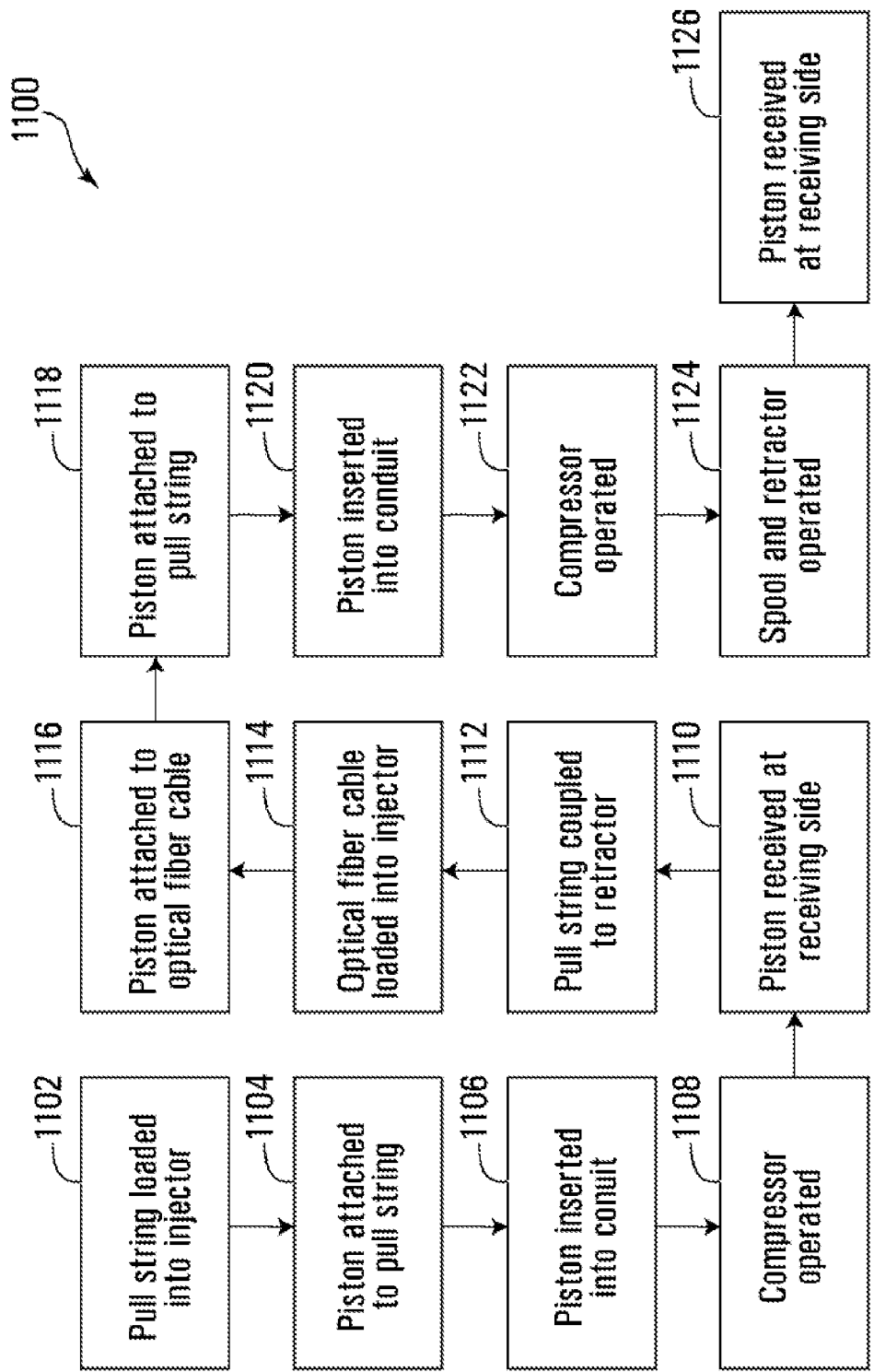
FIG. 11 is a flowchart illustrating a method of deploying optical fiber within a conduit, in accordance with an embodiment of the disclosure.

Turning to FIGS. 10 and 11, there are shown a method 1100 and system 1000 for deploying optical fiber within a conduit, in accordance with an embodiment of the disclosure. Method 1100 uses optical fiber injector 800 described above, though other injectors may be used provided that they operate within the bounds set out by the appended claims. Method 1100 of FIG. 11 includes the jetting of a pull string into the conduit, prior to jetting of the optical fiber cable. Although it is possible to deploy the optical fiber cable without use of a pull string, use of the pull string may be preferable as it may assist with deployment of the optical fiber cable within the conduit.

Method 1100 begins by jetting a pull string 1002 into conduit 814. Pull string 1002 comprises a flexible elongate member such as grip-tight weather-resistant twine. In one embodiment, pull string has a diameter of 1.27 mm, a breaking strength 130 lbs, and is procured from mcmaster.com, part number 078T11. Pull string 1002 has a length greater than that of conduit 814. Jetting of pull string 1002 into conduit 814 is similar to jetting of optical fiber cable 824 into conduit 814, and therefore, in order to describe jetting of pull string 1002, reference is also made to FIG. 9. In order to jet pull string 1002, at step 1102 a spool of pull string 1002 is loaded into a pull string injector. Optical fiber injector 800 may be used as the pull string injector, in which case a spool of pull string 1002 is loaded onto shaft 820. At step 1104, a pull string piston is attached to an end of pull string 1002. The pull string piston may be similar to optical fiber piston 826, and therefore in what follows the pull string piston is also referred to by reference numeral 826. Pull string piston 826 is configured in size and shape to be movable through conduit 814 without becoming stuck in any bends in conduit 814. Pull string piston 826 may be secured to pull sting 1002 using an appropriate adhesive, such as electrical tape. A tension of up to 100 lbs may be applied to pull string piston 826 to test the attachment of pull string piston 826 to pull string 1002. Pull string piston 826 may be coated in a lubricant to assist passage through conduit 814.

At step 1106, pull string piston 826 is inserted into open end 812 of conduit 814, and open end 812 of conduit 814 is then sealingly engaged with air outlet 810 of injector 800. Compressor 816 is then coupled to pressure vessel 802 via one or more of ports 812. A manifold (not shown) is used to monitor and control the pressure of air flowing into pressure vessel 802. At step 1108, using compressor 816, pressurized air is injected into pressure vessel 802 and acts on pull string piston 826 so as to urge pull string piston 826 along conduit 814, thereby jetting pull string 1002 along conduit 814. Progress of the jetting of pull string 1002 may be monitored via a window on tapered snout 808 of injector 800. A typical jetting speed is 5 m/s but can vary depending on the length of the conduit and the number of bends in the conduit. At step 1110, pull string piston 826 is received at the opposite open end 830 of conduit 814. At step 1112, pull string 1002 is then coupled to optical fiber puller or retractor 832, which as described below assists with the subsequent jetting of optical fiber cable 824.

Once pull string 1002 has been deployed within conduit 814, the method proceeds to a series of steps in which optical fiber cable 824 is jetted into conduit 814. In order to jet optical fiber cable 824, at step 1114 a spool 822 of optical fiber cable 824 (such as the reinforced optical fiber cable described above) is loaded into pull string injector 800, by loading spool 822 onto shaft 820. At step 1116, an optical fiber piston (such as the optical fiber piston 826 shown in FIG. 9) is attached to an end of optical fiber cable 824. Optical fiber piston 826 is configured in size and shape to be movable through conduit 814 without becoming stuck in any bends in conduit 814. At step 1118, optical fiber piston 826 is also attached to the end of pull string 1002 that remains on the sending side of system 1000. Optical fiber piston 826 may be secured to pull string 1002 using an appropriate adhesive, such as electrical tape. Thus, optical fiber cable 824 and pull string 1002 are attached end-to-end, with optical fiber piston 826 between them. At step 1120, optical fiber piston 826 is inserted into open end 812 of conduit 814. At step 1122, using compressor 816, pressurized air is injected into pressure vessel 802 and acts on optical fiber piston 826 so as to urge optical fiber piston 826 along conduit 814, thereby jetting optical fiber cable 824 along conduit 814. Progress of the jetting of optical fiber cable 824 may be monitored via the window on tapered snout 808 of injector 800.

During jetting, at step 1124, drive mechanism 818 is operated so as to rotate spool 822 and unwind optical fiber cable 824 therefrom. Unwinding optical fiber cable 824 in this manner assists with the jetting of optical fiber cable 824 along conduit 814. To further assist jetting of optical fiber cable 824, as can be seen in FIG. 11, on the receiving side of system 1000 is located optical fiber puller or retractor 832. Optical fiber retractor 832 is configured to maintain a tension on pull string 1002 during jetting of optical fiber cable 824. Optical fiber retractor 832 includes a load monitor so that the operator may ensure that optical fiber cable 824 is not subjected to undue loads during jetting. In other embodiments, suction may be applied at the open end of conduit 814 on the receiving side, to assist in jetting of optical fiber cable 824. For example, an industrial vacuum pump may be coupled to the open end of conduit 814 on the receiving side, and may suck air out of conduit 814 during jetting of optical fiber cable 824.

At step 1126, once optical fiber piston 826 is received at the receiving side of system 1000, optical fiber cable 824 is determined to have been successfully deployed within conduit 814. The optical fiber comprised in optical fiber cable 824 may then be optically coupled to splice boxes and/or transmission/return couplers as described above. Should optical fiber cable 824 need to be removed from conduit 814, then a piston as described above may be attached to optical fiber cable 824, and optical fiber cable 824 may be jetted out of conduit 814, also as described above.

One or more example embodiments have been described by way of illustration only. This description has been presented for purposes of illustration and description, but is not intended to be exhaustive or limited to the form disclosed. Many modifications and variations will be apparent to those of ordinary skill in the art without departing from the scope of the claims. It will be apparent to persons skilled in the art that a number of variations and modifications can be made without departing from the scope of the claims. For example, in some embodiments, the pull string may be pre-deployed within the conduit, or the optical fiber may be jetted without use of a pull string.

It is furthermore contemplated that any part of any aspect or embodiment discussed in this specification can be implemented or combined with any part of any other aspect or embodiment discussed in this specification.

The invention claimed is:
1. A modular assembly for deployment of optical fiber along a pipeline, the modular assembly comprising:
 a pipeline; and
 a line of two or more conduits arranged end-to-end, each pair of opposing ends of adjacent conduits being connected together by a separate splice box, wherein the line is positioned along and adjacent to a length of the pipeline.
2. The modular assembly of claim 1, further comprising an optical fiber disposed within each of the conduits.

3. The modular assembly of claim 2, wherein the optical fibers disposed within each pair of adjacent conduits are optically connected together via the splice box connecting together the pair of adjacent conduits so as to form a light path through the line.

4. The modular assembly of claim 3, wherein the optical fiber disposed within each of the conduits comprises at least one pair of fiber Bragg gratings.

5. The modular assembly of claim 4, further comprising an optical interrogator optically coupled to the optical fiber disposed within the conduit at an input end of the line, the optical interrogator being operable to transmit light into the optical fiber disposed within the conduit at the input end, and the optical interrogator being operable to receive from the optical fiber disposed within the conduit at the input end the transmitted light which has been reflected by the at least one pair of fiber Bragg gratings.

6. The modular assembly of claim 5, further comprising an absorption unit optically coupled to the optical fiber disposed within the conduit at an absorption end of the line, the absorption unit being operable to absorb light output from the optical fiber disposed within the conduit at the absorption end so as to prevent the output light reflecting back into the optical fiber disposed within the conduit at the absorption end.

7. The modular assembly of claim 6, further comprising an additional optical fiber disposed within each of a plurality of the conduits, the plurality forming an unbroken portion of the line and including the conduit at the input end, wherein the additional optical fibers are optically connected together via the splice boxes connecting together the plurality of the conduits so as to form an additional light path through at least a portion of the line, and wherein the additional optical fiber disposed within the conduit at the input end is optically coupled to the optical interrogator.

8. The modular assembly of 7, wherein the plurality of the conduits includes all of the conduits of the line, and wherein the additional optical fiber disposed within the conduit at the absorption end is optically coupled to the absorption unit.

9. The modular assembly of claim 1, wherein at least one of the splice boxes connecting together a pair of adjacent conduits comprises a circulator;
wherein the one conduit of the pair of adjacent conduits closest an input end of the line comprises a lead-in optical fiber and a separate return optical fiber, the lead-in and return optical fibers being optically coupled to the circulator;
wherein the one conduit of the pair of adjacent conduits closest an absorption end of the line comprises a sensing optical fiber optically coupled to the circulator and comprising a pair of fiber Bragg gratings; and
wherein the circulator is operable to direct light from the lead-in optical fiber to the sensing optical fiber, and to direct light reflected by the pair of fiber Bragg gratings from the sensing optical fiber to the return optical fiber.

10. The modular assembly of claim 9, further comprising an optical interrogator having a transmission coupler and a receiver coupler, the transmission coupler being optically coupled to the lead-in optical fiber such that the optical interrogator is operable to transmit light into the lead-in optical fiber, and the receiver coupler being optically coupled to the return optical fiber such that the optical interrogator is operable to detect from the return optical fiber the transmitted light reflected by the pair of fiber Bragg gratings.

11. The modular assembly of claim 10, wherein an additional one of the splice boxes connecting together an additional pair of adjacent conduits comprises an additional circulator;
wherein the one conduit of the additional pair of adjacent conduits closest an input end of the line comprises an additional lead-in optical fiber and a separate additional return optical fiber, the additional lead-in and additional return optical fibers being optically coupled to the additional circulator;
wherein the one conduit of the additional pair of adjacent conduits closest an absorption end of the line comprises an additional sensing optical fiber optically coupled to the additional circulator and comprising an additional pair of fiber Bragg gratings; and
wherein the additional circulator is operable to direct light from the additional lead-in optical fiber to the additional sensing optical fiber, and to direct light reflected by the additional pair of fiber Bragg gratings from the additional sensing optical fiber to the additional return optical fiber.

12. The modular assembly of claim 1, wherein at least one of the conduits of the line is divided into multiple separate channels, each channel being dimensioned to carry a separate optical fiber.

13. The modular assembly of claim 1, wherein one of the conduits of the line comprises a rod or tape releasably fixed to an internal surface of the one conduit.

14. The modular assembly of claim 1, wherein each conduit is made from a stainless steel capillary tube.

15. The modular assembly of claim 1, wherein the line is positioned within one meter of the length of the pipeline.

16. The modular assembly of claim 15, wherein the line is fixed to an outer surface of the length of the pipeline.

17. A method for deploying optical fiber along a pipeline, the method comprising:
installing a modular assembly along and adjacent to a length of the pipeline, the modular assembly comprising a line of two or more conduits arranged end-to-end, each pair of opposing ends of adjacent conduits being connected together by a separate splice box;
disposing optical fiber within each conduit of the installed modular assembly; and
optically connecting together the optical fibers disposed within each pair of adjacent conduits via the splice box connecting together the pair of adjacent conduits.

18. The method of claim 17, wherein installing the modular assembly comprises coupling the modular assembly to the length of the pipeline prior to installation of the pipeline such that the modular assembly is installed with the pipeline.

19. The method of claim 17, wherein installing the modular assembly comprises positioning the modular assembly within one meter of the length of the pipeline after the pipeline has been installed.

20. The method of claim 17, wherein installing the modular assembly comprises fixing at least one conduit of the modular assembly to an outer surface of the length of the pipeline.

21. The method of claim 17, wherein disposing optical fiber into each conduit comprises pushing at least one optical fiber through at least one conduit using a cable-jetting device or a spooling device.

22. The method of claim 17, wherein disposing optical fiber into each conduit comprises pulling at least one optical fiber through at least one conduit using a rod or tape, wherein the rod or tape is connected to the at least one optical fiber and extends through a majority of the at least one conduit.

23. The method of claim 22, wherein the rod or tape is releasably fixed to an internal surface of the at least one conduit prior to being used to pull the at least one optical fiber through the at least one conduit.

24. The method of claim 17, wherein the disposing of optical fiber into at least one of the conduits comprises:
providing an optical fiber injector comprising a pressure vessel having a fluid inlet and a fluid outlet;
engaging the fluid outlet with an open end of a conduit;
providing a length of optical fiber within the pressure vessel; and
jetting the optical fiber into the conduit by injecting a fluid into the pressure vessel via the fluid inlet, wherein the optical fiber injector is configured such that the fluid is directed from the fluid inlet to the fluid outlet, and urges the optical fiber to move through the conduit, thereby deploying the optical fiber within the conduit.

25. The method of claim 17, further comprising:
disconnecting an optical fiber disposed within one of the conduits from the splice boxes connected at either end of the one conduit;
removing the disconnected optical fiber from the one conduit;
disposing a replacement optical fiber within the one conduit and optically connecting the replacement optical fiber to the splice boxes connected at either end of the one conduit.

26. The method of claim 25, further comprising determining that the optical fiber is malfunctioning prior to disconnecting the optical fiber.

\* \* \* \* \*